US011014040B2

(12) United States Patent
Boulet et al.

(10) Patent No.: US 11,014,040 B2
(45) Date of Patent: May 25, 2021

(54) ADSORPTIVE GAS SEPARATOR

(71) Applicant: INVENTYS THERMAL TECHNOLOGIES INC., Burnaby (CA)

(72) Inventors: Andre Boulet, Bowen Island (CA); Soheil Khiavi, North Vancouver (CA)

(73) Assignee: Svante Inc., Burnaby (CA)

( * ) Notice: Subject to any disclaimer, the term of this patent is extended or adjusted under 35 U.S.C. 154(b) by 200 days.

(21) Appl. No.: 16/089,729

(22) PCT Filed: Mar. 31, 2017

(86) PCT No.: PCT/CA2017/050395
§ 371 (c)(1),
(2) Date: Sep. 28, 2018

(87) PCT Pub. No.: WO2017/165976
PCT Pub. Date: Oct. 5, 2017

(65) Prior Publication Data
US 2019/0160419 A1    May 30, 2019

Related U.S. Application Data

(60) Provisional application No. 62/316,478, filed on Mar. 31, 2016.

(51) Int. Cl.
*B01D 53/06* (2006.01)
*B01D 53/04* (2006.01)
(52) U.S. Cl.
CPC ........ *B01D 53/06* (2013.01); *B01D 53/0407* (2013.01)

(58) Field of Classification Search
CPC ............................. B01D 53/0407; B01D 53/06
See application file for complete search history.

(56) References Cited

U.S. PATENT DOCUMENTS

| 1,912,784 | A | 3/1931 | Miller et al. |
| 2,639,000 | A | 5/1953 | Edwards |
| 2,739,669 | A | 3/1956 | Miller |
| 3,122,200 | A | 2/1964 | Koch |
| 3,176,446 | A | 4/1965 | Siggelin |
| 3,985,181 | A | 10/1976 | Guillot |
| 3,999,597 | A | 12/1976 | Sato |
| 4,027,721 | A | 6/1977 | Gentry |

(Continued)

FOREIGN PATENT DOCUMENTS

| CA | 2342670 A1 | 9/2001 |
| CA | 2824162 A1 | 9/2012 |

(Continued)

OTHER PUBLICATIONS

International Search Report for PCT/CA2017/050395.
Written Opinion for PCT/CA2017/050395.

*Primary Examiner* — Jonathan Miller
(74) *Attorney, Agent, or Firm* — Voyer Law

(57) ABSTRACT

An adsorptive gas separator incorporates a stator having plurality of a fluid passages where a thermal conductivity between a plurality of fluid passages is below a threshold thermal conductivity, to reduce the transfer of heat across the stator. A stator of an adsorptive gas separator may employ a port assembly having a low thermal conductivity and a floating seal which provides for sealing of heat and a fluid stream.

8 Claims, 2 Drawing Sheets

(56) References Cited

U.S. PATENT DOCUMENTS

| | | | |
|---|---|---|---|
| 4,105,062 A | 8/1978 | Bell, III et al. | |
| 4,185,686 A | 1/1980 | Pereira | |
| 4,280,416 A | 7/1981 | Edgerton | |
| 4,364,729 A | 12/1982 | Fresch | |
| 4,372,371 A | 2/1983 | Baker | |
| 4,542,782 A | 9/1985 | Bemer | |
| 4,673,026 A | 6/1987 | Hagar et al. | |
| 4,791,980 A | 12/1988 | Hagar et al. | |
| 4,997,028 A | 3/1991 | Townsend | |
| 5,248,325 A | 9/1993 | Kagimoto et al. | |
| 5,505,825 A | 4/1996 | Gold et al. | |
| 5,577,551 A | 11/1996 | Kritzler et al. | |
| 5,697,619 A | 12/1997 | Fierle | |
| 5,802,870 A | 9/1998 | Arnold et al. | |
| 5,810,895 A | 9/1998 | Staehle et al. | |
| 5,908,492 A | 6/1999 | Lehman et al. | |
| 6,063,161 A * | 5/2000 | Keefer | B01D 53/0446 95/100 |
| 6,328,787 B1 | 12/2001 | Yamauchi | |
| 6,451,095 B1 * | 9/2002 | Keefer | B01D 53/0431 96/125 |
| 6,521,026 B1 | 2/2003 | Goto | |
| 6,527,836 B1 | 3/2003 | White, Jr. et al. | |
| 6,527,837 B2 | 3/2003 | Kurosawa et al. | |
| 6,565,635 B2 | 5/2003 | Keefer et al. | |
| 6,581,676 B2 | 6/2003 | Fierle et al. | |
| 6,598,664 B2 | 7/2003 | Fierle et al. | |
| 6,889,710 B2 * | 5/2005 | Wagner | B01D 53/0462 137/625.46 |
| 6,902,602 B2 * | 6/2005 | Keefer | B01D 53/047 95/97 |
| 7,037,358 B2 * | 5/2006 | Babicki | B01D 53/0423 95/113 |
| 7,231,958 B1 | 6/2007 | Kaser et al. | |
| 7,416,016 B1 | 8/2008 | Kaser | |
| 7,849,913 B2 | 12/2010 | Struensee | |
| 8,262,783 B2 * | 9/2012 | Stoner | F16J 15/342 96/108 |
| 8,316,924 B2 | 11/2012 | Kaser et al. | |
| 8,470,395 B2 * | 6/2013 | Khiavi | C12M 47/18 427/180 |
| 8,551,444 B2 * | 10/2013 | Agnihotri | F16K 11/085 423/648.1 |
| 8,616,233 B2 * | 12/2013 | McLean | F16J 15/3464 137/246.22 |
| 8,776,864 B2 | 7/2014 | Klisura et al. | |
| 8,808,426 B2 | 8/2014 | Sundaram | |
| 8,858,689 B2 * | 10/2014 | Stoner | B01D 53/0446 96/108 |
| 9,050,553 B2 * | 6/2015 | Alizadeh-Khiavi | B01D 53/0473 |
| 9,067,168 B2 | 6/2015 | Frederick et al. | |
| 9,101,872 B2 | 8/2015 | Rarig et al. | |
| 9,120,049 B2 | 9/2015 | Sundaram et al. | |
| 9,687,803 B2 * | 6/2017 | Alizadeh-Khiavi | C01B 3/56 |
| 2001/0009124 A1 | 7/2001 | Suzuki et al. | |
| 2002/0134246 A1 * | 9/2002 | Babicki | B01D 53/0423 96/125 |
| 2004/0094216 A1 * | 5/2004 | Wagner | B01D 53/047 137/625.46 |
| 2005/0145111 A1 * | 7/2005 | Keefer | B01D 53/0454 96/124 |
| 2009/0145574 A1 | 6/2009 | Klisura | |
| 2010/0001220 A1 * | 1/2010 | McLean | F16J 15/3468 251/314 |
| 2010/0089241 A1 * | 4/2010 | Stoner | F16J 15/3448 96/125 |
| 2010/0181043 A1 | 7/2010 | Mueller et al. | |
| 2010/0289223 A1 | 11/2010 | Birmingham et al. | |
| 2010/0300145 A1 | 12/2010 | Masetto et al. | |
| 2011/0048670 A1 | 3/2011 | Podhorsky et al. | |
| 2011/0209613 A1 | 9/2011 | Jensen et al. | |
| 2012/0080160 A1 | 4/2012 | Townsend et al. | |
| 2012/0198881 A1 | 8/2012 | Burk | |
| 2013/0061755 A1 | 3/2013 | Frederick et al. | |
| 2013/0081797 A1 | 4/2013 | Kaser et al. | |
| 2013/0333571 A1 | 12/2013 | Sundaram et al. | |
| 2014/0116534 A1 | 5/2014 | Howell et al. | |
| 2014/0116641 A1 | 5/2014 | Cheng | |
| 2014/0216254 A1 * | 8/2014 | Tammera | B01D 53/0446 95/114 |
| 2015/0129474 A1 | 5/2015 | Bouvier et al. | |
| 2015/0265962 A1 | 9/2015 | Dahlback et al. | |
| 2018/0169567 A1 * | 6/2018 | Vandervorst | B01D 53/0462 |

FOREIGN PATENT DOCUMENTS

| | | |
|---|---|---|
| CN | 102755810 A | 10/2012 |
| EP | 0355106 A1 | 9/1991 |
| EP | 1138368 A1 | 6/2005 |
| EP | 1420197 A1 | 7/2007 |
| EP | 2223730 A1 | 9/2010 |
| EP | 2236480 A1 | 10/2010 |
| EP | 2302267 A1 | 3/2011 |
| EP | 1547666 A1 | 10/2011 |
| EP | 1369627 A1 | 3/2013 |
| JP | 2004057994 | 2/2004 |
| WO | 9814743 A1 | 4/1998 |
| WO | 2006101366 A1 | 9/2006 |
| WO | 2006120371 A1 | 11/2006 |
| WO | 2010132143 A1 | 11/2010 |
| WO | 2015119736 A1 | 8/2015 |

* cited by examiner

ADSORPTIVE GAS SEPARATOR

TECHNICAL FIELD

The present technology relates generally to an adsorptive gas separator for adsorptive gas separation. More particularly, the present technology relates to the design of a stator, and a port assembly, for an adsorptive gas separator.

BACKGROUND

Conventional temperature swing adsorptive gas separation processes are known in the art for use in adsorptive separation of multi-component gas mixtures. During an adsorption step, a feed stream such as a multi-component fluid mixture at a lower temperature may typically be admitted into an adsorptive gas separator and contactor comprising an adsorbent material, where the adsorbent material may adsorb a component of the feed stream, separating the adsorbed component from the remaining components of the feed stream. During one or more subsequent regeneration steps, typically at least one fluid stream at a higher temperature may be admitted into the adsorptive gas separator and contactor to increase the temperature of the adsorbent material, causing the adsorbed components to release or desorb from the adsorbent material, and to allow for cyclic reuse of the adsorbent material. During an optional cooling or conditioning step, typically a fluid stream at a lower temperature may be admitted into the adsorptive gas separator and contactor to decrease the temperature of the adsorbent material in preparation for a subsequent adsorbing step. In general, the adsorbing, regenerating and conditioning steps may then be sequentially repeated.

A conventional adsorptive gas separator may typically be configured with multiple adsorbent beds, multiple adsorbent contactors or multiple zones, such as for example, a plurality of discrete adsorbent beds or contactors, or at least one contactor where a point on a contactor may move through a plurality of substantially fluidly separated zones within an adsorptive gas separator, where adsorbent beds, adsorbent contactors or zones are located in close proximity and/or adjacent to each other while performing different steps of an adsorptive gas separation process, typically at different temperatures. An adsorptive gas separator having at least one adsorbent bed, adsorbent contactors or multiple zones may also be configured where the various fluid streams supplied to and recovered from the adsorptive gas separator are at a fixed location while the at least one adsorbent beds or contactors moves, for example, in a rotary configuration the at least one adsorbent bed or contactor may rotate through the various fluid streams and zones. A conventional adsorptive gas separation process employing an adsorptive gas separator with at least one adsorbent bed or adsorbent contactor may typically face several competing design challenges including, for example, short cycle time of the adsorptive gas process, sealing of the various fluid streams between dynamic and static components, and undesirable heat transfer between zones with an adsorptive gas separator which may undesirably result in thermal lag, and reduced performance of an adsorptive contactor and overall separator. Furthermore, the thermal cycling of a typical conventional adsorptive gas separation process may undesirably reduce the life expectancy of some conventional separator components.

SUMMARY

In accordance with an embodiment of the present disclosure, an adsorptive gas separator is provided, comprising: at least one stator having a plurality of fluid passages for conveying one or more fluid streams; at least one contactor comprising at least one adsorbent material; and an enclosure attached to the stator for housing the at least one contactor, where a thermal conductivity between each of the plurality of fluid passages is equal to or less than a threshold thermal conductivity. In a particular such embodiment, the thermal conductivity between each of the plurality of fluid passages may be equal to or less than a threshold thermal conductivity of about 10 W/m·K, for example. In accordance with another embodiment, the threshold thermal conductivity may be less than or equal to 8 W/m·K or 5 W/m·K, for example.

In accordance with another embodiment of the present disclosure, an adsorptive gas separator is provided comprising: at least one stator; a plurality of port assemblies each comprising a port and a fluid passage where the port assembly is attached to the at least one stator; and at least one contactor comprising at least one adsorbent material and fluidly connected to the port and the fluid passage of the port assembly, where a thermal conductivity between the fluid passages of the plurality of port assemblies is equal to or less than a threshold thermal conductivity. In a particular such embodiment, the thermal conductivity between the fluid passages of each of the port assemblies may be equal to or less than a threshold thermal conductivity of about 10 W/m·K, for example. In accordance with another embodiment, the threshold thermal conductivity may be less than or equal to 5 W/m·K or 2 W/m·K, for example.

In accordance with a further embodiment of the present disclosure, an adsorptive gas separator is provided comprising: an enclosure for housing the adsorptive gas separator; a rotor assembly attached to the enclosure where the rotor assembly comprises at least one contactor comprising at least one adsorbent material; a stator attached to the enclosure, and at least one port assembly attached to the stator where the each port assembly is fluidly connected to the a contactor, wherein the at least one port assembly additionally comprises a thermal conductivity equal to or less than a threshold thermal conductivity. In a particular such embodiment, the thermal conductivity of each of the port assemblies may be equal to or less than a threshold thermal conductivity of about 10 W/m·K, for example. In accordance with another embodiment, the threshold thermal conductivity may be less than or equal to 5 W/m·K or 2 W/m·K, for example.

In accordance with yet a further embodiment of the present disclosure, a port assembly is provided, comprising: an enclosure or housing, at least one seal urging device, a diaphragm attached to the enclosure or housing, and a floating seal attached to the diaphragm and the at least one seal urging device.

BRIEF DESCRIPTION OF THE DRAWINGS

Like reference numerals refer to corresponding parts throughout the several views of the drawings.

DETAILED DESCRIPTION

Figure 1B:
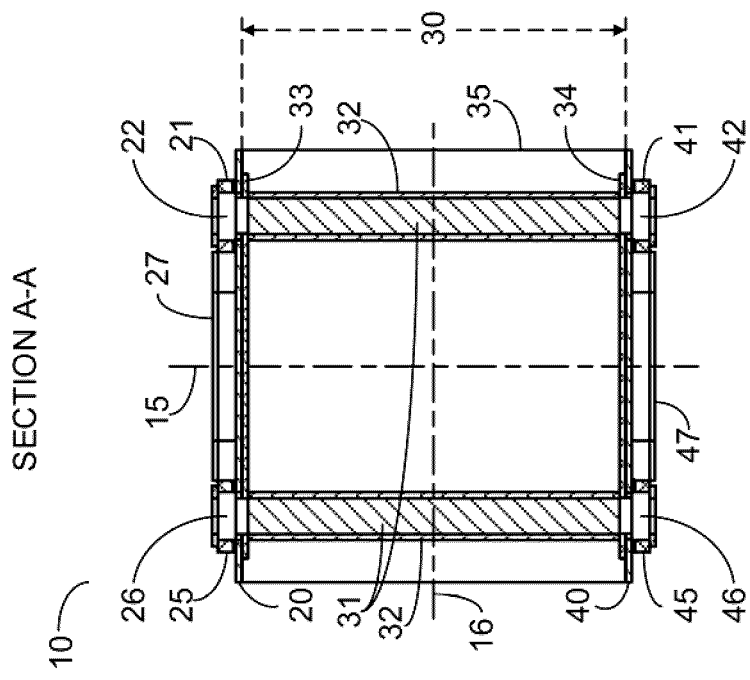
FIG. 1b is a cross-sectional view illustrating the adsorptive separator shown in FIG. 1a, taken along section A-A, according to an embodiment of the present disclosure.
Figure 1A:
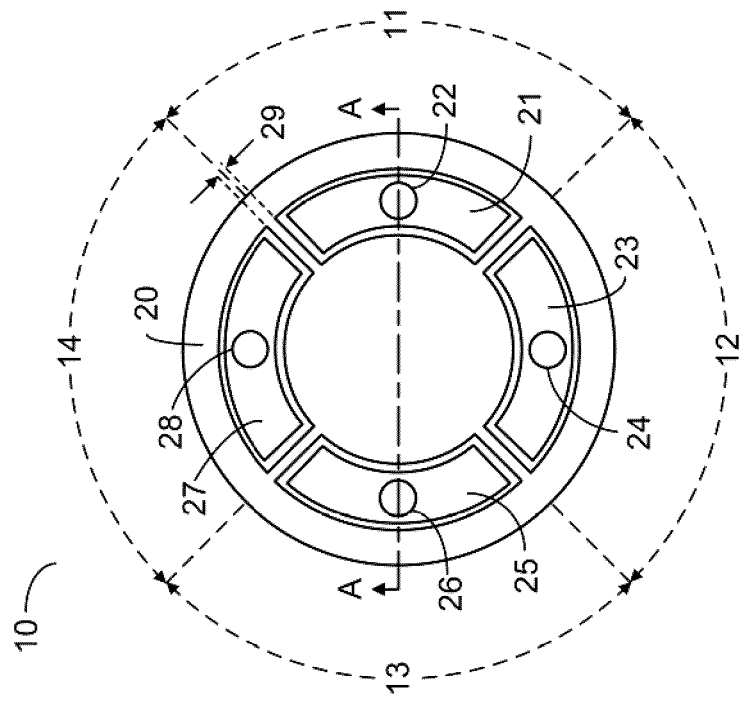
FIG. 1a is a top view illustrating an adsorptive separator according to an embodiment of the present disclosure.

FIGS. 1a and 1b illustrate an adsorptive gas separator (herein referred to as an "adsorptive separator") according to an embodiment of the present disclosure, the adsorptive separator 10 comprising at least a first port assembly 21 having a desirably low thermal conductivity, and a substantially thermally isolated stator 20. FIG. 1a illustrates a top view of the exemplary adsorptive separator 10 according to one embodiment, while FIG. 1b illustrates a cross-section view along section A-A of FIG. 1a of the exemplary adsorptive separator 10, according to an embodiment of the present disclosure. Referring to FIGS. 1a and 1b, adsorptive separator 10, comprises: a first stator 20, further comprising a first exemplary port assembly 21, a second exemplary port assembly 23, a third exemplary port assembly 25, a fourth exemplary port assembly 27; a rotary assembly 30 which comprises at least one contactor 31, an insulation layer 32, a first annular disk 33, a second annular disk 34, an optional enclosure 35; and a second stator 40 which comprises a first stator port assembly 41, a second stator port assembly (not shown in FIG. 1a or 1b), a third port assembly 45, and a fourth port assembly 47. In one aspect, each contactor 31 may further comprise one or more parallel fluid passages (not shown in FIG. 1a or 1b) oriented substantially parallel to a longitudinal axis 15, and at least one adsorbent material (not shown in FIG. 1a or 1b) such as comprised in or on the walls (not shown in FIG. 1a or 1b) of the parallel fluid passages. In a particular aspect, a contactor 31 may optionally also comprise substantially continuous thermally conductive filaments oriented substantially parallel to longitudinal axis 15, such as comprised in or in contact with the walls of the parallel fluid passages, and/or insulation 32 of the contactor 31. In one such aspect, the optional substantially continuous thermally conductive filaments may also be in direct contact with the at least one adsorbent material in the contactor 31.

In one embodiment, rotor assembly 30 and at least one contactor 31 may be adapted to rotate around longitudinal axis 15 such as through four exemplary zones, such as for example, a first zone 11, a second zone 12, a third zone 13, and a fourth zone 14, and any suitable mechanical means, for example, an electric motor (not shown in FIG. 1a or 1b), may be employed to rotate rotor assembly 30. In one such embodiment, the exemplary zones may be substantially evenly spaced around the stator 20, for example. In one aspect, adsorptive separator 10 comprises four exemplary port assemblies on stator 20, a first port assembly 21 having a port 22, a second port assembly 23 having a port 24, a third port assembly 25 having a port 26, and a fourth port assembly 27 having a port 28. In another aspect, adsorptive separator 10 may also employ four port assemblies on second stator 40, such as a first port assembly 41 having a port 42, a second port assembly having a corresponding port (both not shown in FIG. 1a or 1b), a third port assembly 45 having a port 46, and a fourth port assembly having a corresponding port (not shown in FIG. 1a or 1b). In one embodiment, stator 20 and stator 40 may be substantially parallel to a transverse axis 16 which is oriented substantially perpendicular to longitudinal axis 15. In accordance with one aspect, a stator, for example, stator 20 and stator 40, may comprise a stationary supporting structure attached at an end of a contactor which may assist in supporting, for example, an adsorptive enclosure, the contactor and/or connections, such as for example, a fluid connection, between the contactor and a fluid supply or fluid conduit, where the stator may comprise at least one port for conveying a fluid stream therethrough, which may be employed in an adsorptive process.

In one embodiment according to the present disclosure, adsorptive separator 10 may employ any suitable adsorbent materials including but not limited to, for example, desiccant, activated carbon, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, carbon fiber, carbon nanotube, nano-materials, metal salt adsorbent, perchlorate, oxalate, alkaline earth metal particle, ETS, CTS, metal oxide, supported alkali carbonates, alkali-promoted hydrotalcites, chemisorbent, amine, organo-metallic reactant, and metal organic framework adsorbent materials, and combinations thereof.

In accordance with one embodiment of the present disclosure, an exemplary adsorptive gas separation process, hereinafter referred to as an "adsorptive process", is provided where the adsorptive process comprises an adsorbing step, a first regenerating step, an optional second regenerating step and an optional conditioning step. During an exemplary such adsorptive process, a first step or adsorbing step of the adsorptive process may occur in a first zone 11 of adsorptive separator 10, a second step or first regenerating step of the adsorptive process may occur in a second zone 12 of adsorptive separator 10, an optional third step or optional second regenerating step of the adsorptive process may occur in a third zone 13 of adsorptive separator 10, and an optional fourth step or optional conditioning step of the adsorptive process may occur in a fourth zone 14 of adsorptive separator 10. In one aspect, first zone 11 of adsorptive separator 10 may comprise, for example, the fluid connection of at least one contactor 31 to exemplary port assembly 21 at one end thereof, and to exemplary port assembly 41 at a second end thereof. Second zone 12 of adsorptive separator 10 may comprise, for example, the fluid connection of at least one contactor 31 to exemplary port assembly 23 at one end thereof, and to a corresponding port assembly (not shown in FIGS. 1a and 1b) at a second end thereof. Similarly, third zone 13 of adsorptive separator 10 may comprise, for example, the fluid connection of at least one contactor 31 to exemplary port assembly 25 at one end thereof, and to exemplary port assembly 45 at a second end thereof. Also similarly, fourth zone 14 of adsorptive separator 10 may comprise, for example, the fluid connection of at least one contactor 31 to exemplary port assembly 27 at one end thereof, and to exemplary port assembly 47 at a second end thereof. Alternatively, in another embodiment, additional steps of an adsorptive process and additional zones of an adsorptive separator may optionally be employed. In one aspect, such zones need not be evenly spaced around a rotor and/or stator of the separator, and/or the zones need not be the same size. In one such aspect, for example, an angular dimension of one or more exemplary arcuate zones may differ, and the angular dimension of at least one zone, may differ from the angular dimension of at least one adsorbent bed or contactor, such as for example, in one exemplary embodiment where an angular dimension of a zone may be about 80°, while a single contactor may have an angular dimension of about 360° whereby such a contactor may comprise substantially the entire circumference of the separator, for example.

In one embodiment according to the present disclosure, at least one contactor 31 in a first zone 11 of adsorptive separator 10 may be fluidly connected to a feed stream source (not shown in FIGS. 1a and 1b) via port assembly 21 and port 22, for example, such as for receiving a feed stream from the feed stream source (not shown in FIGS. 1a and 1b) during an adsorbing step of an adsorptive process. In one such embodiment, a feed stream may be received at a temperature of, for example, less than about 50° C. In one such embodiment, at least one contactor 31, may also be fluidly connected to a stack and thereby to an ambient environment (both not shown in FIGS. 1a and 1b) via port assembly 41 and port 42, for example, such as for recovering a first product stream from the contactor 31. In one such embodiment, a first product stream may be recovered at a temperature of, for example, greater than about 30° C., from at least one contactor 31 in first zone 11 of adsorptive separator 10. In one aspect, the first product stream recovered from the contactor 31 may be admitted into a stack and thereby to an ambient environment (both not shown in FIGS. 1a and 1b) during the adsorption step of the adsorptive process. In one embodiment, at least one contactor 31 in a second zone 12 of adsorptive separator 10 may be fluidly connected to a first regeneration stream source (not shown in FIGS. 1a and 1b) via a port assembly 43 and port 44 (both not shown in FIGS. 1a and 1b), for example, such as for receiving a first regeneration stream from the first regeneration stream source (not shown in FIGS. 1a and 1b) during a first regenerating step of the adsorptive process. In one such embodiment, the first regeneration stream may be received at a temperature of, for example, about 80-200° C. In one aspect, contactor 31 may be fluidly connected to at least one of a condenser and a compressor (both not shown in FIGS. 1a and 1b) via a port assembly 23 and port 24, for example, such as for recovering a second product stream from the at least one contactor 31 in second zone 12 of adsorptive separator 10, and admitting the second product stream into one or more of the condenser and compressor (both not shown in FIGS. 1a and 1b) during the first regenerating step of the adsorptive process. In one such aspect, the second product stream may be recovered at a temperature of, for example, greater than about 100° C.

In one embodiment, at least one contactor 31 in a third zone 13 of adsorptive separator 10 may be fluidly connected to a second regeneration stream source (not shown in FIGS. 1a and 1b) via a port assembly 25 and port 26, for example, such as for receiving a second regeneration stream from the second regeneration stream source (not shown in FIGS. 1a and 1b) during a second regenerating step of the adsorptive process, and may be optionally fluidly connected to a fluid conduit, such as for conducting at least a portion of the third product stream for further use, such as for example, in a combustor, another contactor of an adsorptive separator (both not shown in FIGS. 1a and 1b), or for recycle into a first zone 11 of adsorptive separator 10, via a port assembly 45 and port 46, for example, such as for recovering a third product stream. In one such aspect, the second regeneration stream may be received at a temperature of, for example, about 70-150° C. In a further aspect, the third product stream may be recovered at a temperature of, for example, less than about 110° C., from at least one contactor 31 in third zone 13 of adsorptive separator 10, and in one embodiment may be admitted into a further downstream use, such as into a combustor (not shown in FIGS. 1a and 1b) during the second regenerating step of the adsorptive process.

In one embodiment, at least one contactor 31 in a fourth zone 14 of adsorptive separator 10 may be fluidly connected to a conditioning stream source (not shown in FIGS. 1a and 1b) via a port assembly 27 and port 28, for example, such as for receiving a conditioning stream, from the conditioning stream source (not shown in FIGS. 1a and 1b) during a conditioning step of the adsorptive process, and may be fluidly connected to a combustor (not shown in FIGS. 1a and 1b) via a port assembly 47 and port 48 (not shown in FIGS. 1a and 1b) for example, such as for recovering a fourth product stream from at least one contactor 31 in a fourth zone 14 of adsorptive separator 10. In one aspect, the fourth product stream may then be admitted into a fluid conduit, such as for conducting at least a portion of the fourth product stream for further use, such as in a combustor, or to a stack (both not shown in FIGS. 1a and 1b), during the conditioning step of the adsorptive process. In one such embodiment, the conditioning stream may be received in the contactor 31 at a temperature of, for example, less than about 50° C., and the fourth product stream may be recovered from the contactor 31 at a temperature of, for example less than about 50° C.

In one embodiment, during the exemplary adsorptive process, at least one contactor 31 in a first zone 11 of adsorptive separator 10 may operate at a temperature range of, for example, about 30-80° C., at least one contactor 31 in second zone 12 of adsorptive separator 10, may operate at a temperature range of, for example, about 100-160° C., at least one contactor 31 in third zone 13 of adsorptive separator 10, may operate at a temperature range of, for example, about 50-150° C., and at least one contactor 31 in fourth zone 14 of adsorptive separator 10 may operate at a temperature range of, for example, about 5-50° C. In one such embodiment, at least one contactor 31 may be fluidly connected in any of first zone 11, second zone 12, third zone 13, and fourth zone 14 of adsorptive separator 10 for a duration of, for example, about 5-60 seconds. In one aspect, a temperature differential existing between each of the first zone 11, second zone 12, third zone 13, and fourth zone 14 during operation of an adsorptive separator may pose operational and/or design challenges including, for example, differential thermal expansion and/or contraction of at least one contactor 31 between one zone and another, which may result in at least one contactor 31 or a portion of at least one contactor 31 having a different length (parallel to longitudinal axis 15) in different zones of the adsorptive separator due to such differing operational temperatures. In another aspect, such temperature differentials between each of the zones 11, 12, 13, and 14 during operation may also result in undesirable transfer of heat from one zone to another zone, which in one aspect may undesirably affect adsorptive/desorptive performance in contactor 31, for example.

Figure 2:
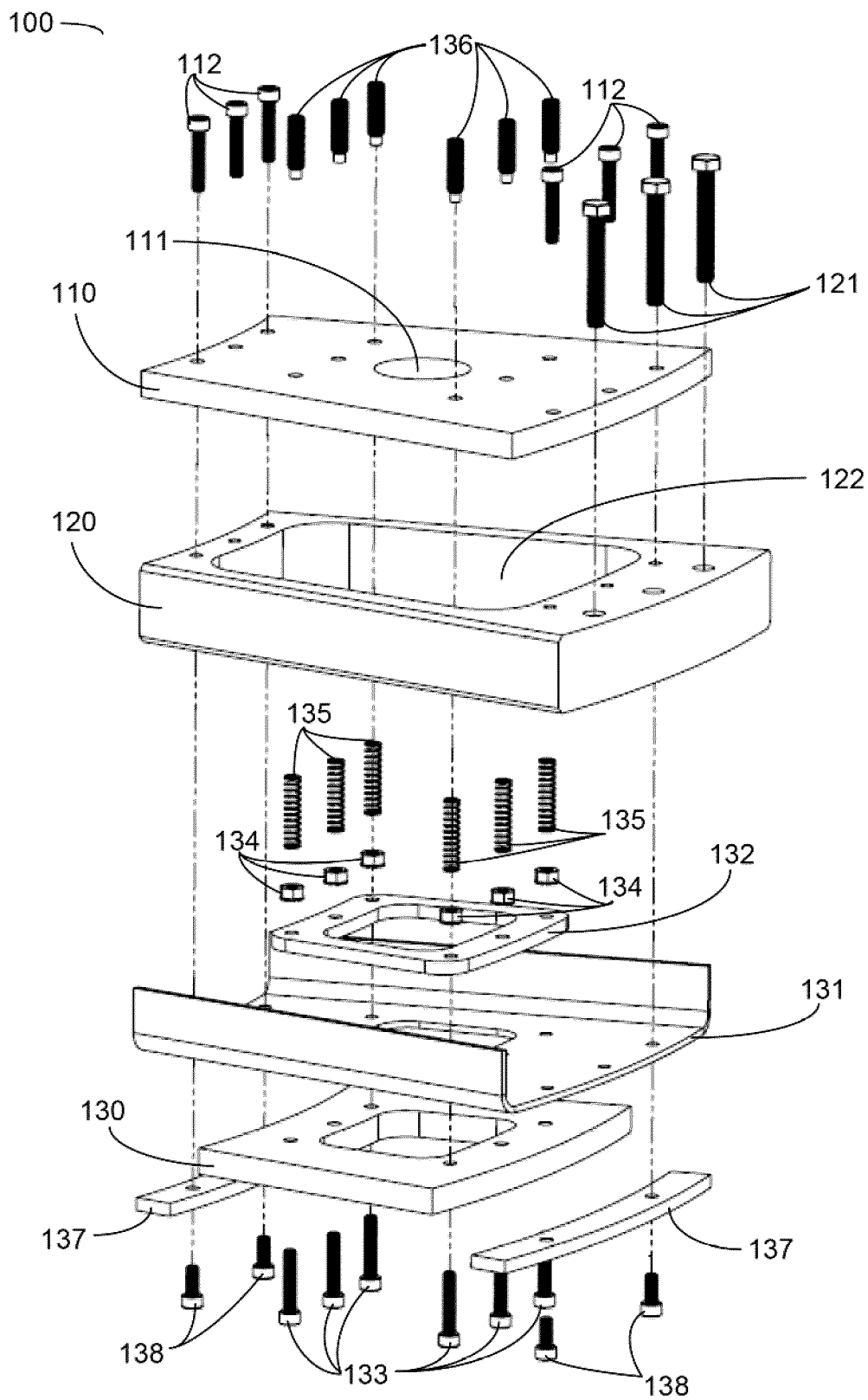
FIG. 2 is an exploded view illustrating a port assembly which may be incorporated into the exemplary adsorptive separator shown in FIGS. 1a and 1b, in accordance with an embodiment of the present disclosure.

FIG. 2 illustrates an exploded view of a port assembly 100 according to an exemplary embodiment of the present disclosure, and which may be incorporated into an adsorptive separator such as described herein, for example, (referring to FIGS. 1a and 1b) such as adsorptive separator 10. In one embodiment, port assembly 100 comprises a cover 110, a port 111, a plurality of fasteners 112 attaching cover 100 to a enclosure or housing 120, a fluid passage 122 passing through enclosure or housing 120, a floating seal 130, a diaphragm 131, a backing plate 132, a plurality of fasteners 133 and corresponding members such as nuts 134, a plurality of biasing members such as springs 135, a plurality of adjustors 136 cooperating with biasing members or springs 135, at least one retainer 137 and a plurality of fasteners 138 such as for attaching retainer 137 to enclosure or housing 120. In one aspect, port 111 may be employed to attach a fluid conduit (not shown in FIG. 2) to cover 110 which may be attached to enclosure or housing 120 such as by a plurality of fasteners 112, where the fluid conduit (not shown in FIG. 2) may be employed to fluidly connect at least one contactor of an adsorptive separator (both not shown in FIG. 2) via fluid passage 122 and port 111 to, for example, a fluid stream source or a fluid stream sink or other destination for further use such as in an industrial process, for example (both not shown in FIG. 2). In another aspect, a plurality of fasteners 133 and a plurality of corresponding members such as nuts 134 may be used to attach floating seal 130 to diaphragm 131 and optionally also to backing plate 132. In one aspect, diaphragm 131 may attach to the bottom of enclosure or housing 120 such as by at least one retainer 137 and a plurality of fastener 138 for example, and in one aspect may form a gas seal substantially sealing between the bottom of enclosure or housing 120 and the surrounding ambient environment such as to seal against leakage of the employed fluid streams passing through port 111 and opening 122 during operation of the adsorptive separator.

In one aspect, diaphragm 131 comprises a flexible or resilient material which enables floating seal 130 to float or resiliently move in one or more or optionally in substantially all directions while assisting in sealing fluid passage 122. In one embodiment, a plurality of biasing members such as springs 135 may seat against a plurality of fasteners such as nuts 134 and a cooperating plurality of adjustors 136 which may be attached to cover 110, whereby a seal force or biasing force, such as a spring force of springs 135 may be selectively adjusted and preloaded by a seal force adjusting mechanism such as adjustors 136. In one such embodiment, a plurality of biasing members such as springs 135, connected via plurality of connectors (such as nuts 134), and diaphragm 131 may urge or bias backing plate 132 and floating seal 130 to contact a mating surface, for example, a distal surface (not shown in FIG. 2, direction relative to a rotor assembly) of an annular disk (not shown in FIG. 2, but shown in FIG. 1b as annular disk 33) attached to the opposing ends of a rotor assembly (not shown in FIG. 2, shown in FIG. 1b as rotor assembly 30) of an adsorptive separator, forming a seal between a substantially static port assembly 100 of a stator (not shown in FIG. 2) and the dynamic rotating annular disk and rotor assembly (not shown in FIG. 2). In one aspect, the annular disk (not shown in FIG. 2, but shown in FIG. 1b as annular disk 33) attached to the opposing ends of a rotor assembly (not shown in FIG. 2, shown in FIG. 1b as rotor assembly 30) may have a low thermal capacity and thermal conductivity. In one such aspect, floating seal 130 may be flexible and/or thin and may desirably and advantageously conform to the annular disk (not shown in FIG. 2, but shown in FIG. 1b as annular disk 33) and assist in sealing a fluid opening in the annular disk, and in one aspect may also desirably reduce thermal mass and/or reduce thermal conductivity between the sealed elements.

In one embodiment, backing plate 132 may be harder or less resilient than floating seal 130, so as to distribute the force of the plurality of biasing members such as springs 135 over floating seal 130 and have a contact area which is smaller than a sealing contact area of floating seal 130. In one such aspect, the plurality of biasing members such as springs 135 and the diaphragm 131 of port assembly 100 may also desirably provide for travel of floating seal 130 to accommodate for variations and changes in the distance between port assembly 100 and the distal surface of an annular disk of a rotor assembly of an adsorbent separator, which in one aspect may be a result of, for example, differential thermal expansion of one or more contactors or portions of a contactor. In one such aspect, floating seal 130 may comprise a face seal having a relatively large sealing contact area surrounding fluid passage 122, which may be fluidly connected at least a portion of the time to at least one corresponding fluid passage on the annular disk attached to the rotor assembly and at least one contactor (not shown in FIG. 2) in the rotor assembly. In one such aspect, the at least one contactor may be sealed to a proximal surface (not shown in FIG. 2, direction relative to the rotor assembly) of the annular disk of the rotor assembly. In such an embodiment, fasteners 121 may be used to fasten port assembly 100 to the stator of the adsorptive separator. In one aspect, port assembly 100 may be employed to provide a fluid passage for one fluid stream for an adsorptive process which may advantageously reduce the probability of leakage between, for example, port assemblies (or port-to-port leakage), and one zone to another zone, as potential leakage from port assembly 100 may escape to the ambient environment. Furthermore, employing port assembly 100 comprising floating seal 130 may in various aspects advantageously enable one or more of: flexibility in construction of an adsorptive separator, sizing of a port assembly independent of another port assembly, and allowing independently adjustable sealing force between the stator and rotor assembly.

In a particular embodiment, port assembly 100 may substantially reduce the leakage of a fluid stream and heat from port assembly 100, such as by providing components, which may contact or provide a thermal path to other components of a stator and/or a rotor assembly, for example, enclosure or housing 120, and floating seal 130, comprised of materials having a thermal conductivity equal to or less than a threshold thermal conductivity (thermal conductivity may be expressed using a unit of measure of watts per meter kelvin, herein referred to as "W/m·K"). In one exemplary embodiment, port assembly 100 may comprise a thermal conductivity of equal to or less than a threshold thermal conductivity of about 10 W/m·K, or in a particular embodiment, equal to or less than about 5.0 W/m·K, or more particularly equal to or less than about 2.0 W/m·K or yet more particularly, equal to or less than about 0.3 W/m·K, for example. In one aspect, port assembly 100 may comprise components comprised of materials having a thermal conductivity of equal to or less than a threshold thermal conductivity of about 10 W/m·K, or in a particular embodiment, equal to or less than about 5.0 W/m·K, or more particularly equal to or less than about 2.0 W/m·K or yet more particularly equal to or less than about 0.3 W/m·K, for example. In one exemplary embodiment, enclosure or housing 120 may comprise a polymer material having a thermal conductivity of less than about 10 W/m·K, and more particularly about 0.5 W/m·K, diaphragm 131 may comprise a rubber material having a thermal conductivity of less than about 10 W/m·K, and more particularly about 0.16 W/m·K, and floating seal 130 may comprise a polytetrafluoroethylene material having a thermal conductivity of less than about 10 W/m·K, and more particularly about 0.25 W/m·K. Optionally, the threshold thermal conductivity may be applicable along a transverse plane of an adsorptive separator, defined as a plane substantially transverse to an axis which at least one adsorbent bed or contactor rotates around, or a plane substantially transverse to a longitudinal axis of substantial fluid passages of an adsorbent bed or contactor. In one aspect, components comprising materials having a low thermal conductivity may advantageously reduce the transfer of heat between, for example, a port assembly to another port assembly, and a port assembly to a stator of an adsorptive separator. In one such aspect, use of such low thermal conductivity materials may result in reducing the heat transfer between zones of an adsorptive separator, reduce thermal lag and improve the performance of an adsorptive separator and adsorptive process.

In one embodiment, a port assembly 100 may have a thermal conductivity equal to or less than a threshold thermal conductivity, which in one aspect may optionally be a thermal conductivity measured along a transverse plane of an adsorptive separator or port assembly. In one such embodiment, the thermal conductivity threshold may comprise about 10 W/m·K, or in particular about 5.0 W/m·K, or more particularly about 2.0 W/m·K, or yet more particularly about 0.3 W/m·K, for example.

In one embodiment, an adsorptive separator may comprise at least one thermally isolated stator further comprising at least one port assembly 100 or optionally all port assemblies having a thermal conductivity optionally along a transverse plane of the adsorptive separator or stator, equal to or less than a threshold thermal conductivity of about 10 W/m·K, or in a particular embodiment less than or equal to about 5.0 W/m·K, or more particularly about 2.0 W/m·K, or yet more particularly about 0.3 W/m K. In one such embodiment, an adsorptive separator may comprise at least one thermally isolated stator further comprising at least one port assembly or optionally all port assemblies having a thermal conductivity equal to or less than a threshold thermal conductivity along a transverse plane of an adsorptive separator or stator of about 10 W/m·K, or in a particular embodiment less than or equal to about 5.0 W/m·K, or more particularly about 2.0 W/m·K, or yet more particularly about 0.3 W/m·K, for example.

In a particular embodiment, an adsorptive separator may comprise at least one stator where a plurality of fluid streams employed for an adsorptive process are conveyed through a plurality of fluid passages within the at least one stator having a thermal conductivity equal to or less than a threshold thermal conductivity between the plurality of fluid passages, wherein the threshold thermal conductivity may optionally be determined along a transverse plane of an adsorptive separator or stator. In one such particular embodiment, the at least one stator may comprise a thermal conductivity equal to or less than a threshold thermal conductivity of about 10 W/m·K, or in particular, about 5.0 W/m·K, or more particularly about 2.0 W/m·K, or yet more particularly about 0.3 W/m K, for example. In one aspect, for example, referring to FIGS. 1a and 1b, a feed stream may be admitted into adsorptive separator 10 and at least one contactor 31 via port 22, port assembly 21, and stator 20, while a conditioning stream may be admitted into adsorptive separator 10 and at least one contactor 31 via port 28, port assembly 27, and stator 20 where the thermal conductivity between fluid passages in stator 20, or specifically between a fluid passage of port assembly 21 and a fluid passage of port assembly 27 may be equal to or less than a threshold thermal conductivity, which in one aspect may be a threshold thermal conductivity of about 10 W/m·K, or in particular about 5.0 W/m·K, or more particularly about 2.0 W/m·K, or yet more particularly about 0.3 W/m K, for example.

In one embodiment, an adsorptive separator may comprise at least one port assembly having a thermal conductivity equal to or less than a threshold thermal conductivity, optionally determined along a transverse plane of an adsorptive separator, of about 10 W/m·K, or in a particular aspect about 5.0 W/m·K, or more particularly about 2.0 W/m·K, or yet more particularly about 0.3 W/m K.

In a further embodiment, an adsorptive separator may comprise at least one stator, a plurality of port assemblies and at least one thermal insulating device, for example, a thermally insulating material, a thermally insulating structure, a thermally insulating gas, and/or an air gap, situated between one or more of the plurality of port assemblies, where the at least one thermal insulating device reduces the transfer of heat in a direction along a transverse plane of an adsorptive separator. In one such embodiment, for example, referring to FIG. 1a, stator 20 is configured to have a plurality of air gaps 29 situated between port assembly 21 and port assembly 27, port assembly 25 and port assembly 27, port assembly 23 and port assembly 25, and port assembly 23 and port assembly 21, which in one aspect may advantageously reduce the transfer of heat, for example, along a plane substantially parallel to transverse axis 16 of adsorptive separator 10 and in a further aspect, may desirably allow any fluid leakage from a port assembly to escape into the ambient environment. In one embodiment, employing at least one thermally insulating device situated between at least one pair of port assemblies may advantageously reduce the undesirable transfer of heat from one zone to another zone within an adsorptive separator 10. In an adsorptive separator according to one embodiment of the present disclosure, a stator may comprise at least one port assembly, for sealing a fluid stream admitted into or recovered from at least one contactor via a rotor assembly of an adsorptive separator, where the port assembly further comprises one or more of: a floating seal where movement may occur along any point of the seal; a large contact or sealing area, for example, a face seal, mounted on a diaphragm and surrounding a fluid passage; a seal biasing or urging device, for example, a spring; a seal force adjusting mechanism, for example, an adjustor; a port, and optionally an enclosure or housing. In one such embodiment, for example, referring to FIG. 2, a stator (not shown in FIG. 2) may comprise at least one port assembly 100, further comprising a floating seal 130 for sealing a fluid stream between the stator and a rotor assembly (not shown in FIG. 2), which may advantageously reduce the thermal capacity of the rotor assembly and which in one aspect may result in one or more of: reducing the transfer of heat from one zone to another zone of the separator, reducing thermal lag, and reducing the exposure of floating seal 130 to a cyclical swing in temperature, such as by exposing floating seal 130 substantially continuously to one fluid stream during an adsorptive process, which in a further aspect may advantageously result in increasing the life expectancy of at least one of: floating seal 130, diaphragm 131, and spring 135.

In alternative embodiments, an adsorptive separator may comprise at least one port assembly having additional ports and/or different shaped ports in comparison with those illustrated in FIG. 1a, 1b or 2. In one alternative embodiment, at least one port may be situated on at least one side of an enclosure or housing 120, for example. In a further embodiment, enclosure or housing 120 and cover 110 may be formed as a single component. In one embodiment, the sealing force of a floating seal may be provided by at least one seal biasing or urging device which in one aspect may employ various biasing or urging means, such as for example, mechanical, pneumatic, electro-magnetic, or hydraulic biasing or urging means, or any combination thereof. In one embodiment, a floating seal may comprise a graphite, or an aramid material. In one embodiment, an adsorptive separator may comprise one or more port assemblies further comprising a floating seal having a material which differs from a material employed for a floating seal of another port assembly of the separator. In one aspect, a bellows or a metal bellows device employing a thermal insulation material, a thermal isolation or a thermal break, for example, may be employed in place of a plurality of springs or similar means for biasing or urging the seal. In one embodiment, at least one retainer 137 may comprise a single component having any suitable shape, for example, a square annulus, or a rectangular annulus for attaching and sealing diaphragm 131 to enclosure or housing 120.

The exemplary embodiments herein described are not intended to be exhaustive or to limit the scope of the technology to the precise forms disclosed. They are chosen and described to explain the principles of the technology and its application and practical use to allow others skilled in the art to comprehend its teachings.

As will be apparent to those skilled in the art in light of the foregoing disclosure, many alterations and modifications are possible in the practice of this technology without departing from the scope thereof. Accordingly, the scope of the technology is to be construed in accordance with the substance defined by the following claims.

What is claimed is:

1. An adsorptive gas separator comprising:
   an enclosure for housing said adsorptive gas separator;
   a rotor assembly attached to said enclosure, said rotor assembly comprising at least one contactor, said at least one contactor comprising at least one adsorbent material;
   a stator attached to said enclosure;
   at least one port assembly attached to said stator for forming a seal between said stator and said rotor assembly, said at least one port assembly comprising:
      a fluid passage for fluid connection to said at least one contactor;
      a diaphragm attached to said stator, said diaphragm fluidly connected to said fluid passage; and
      a floating seal mounted to said diaphragm and contacting said rotor assembly, said floating seal fluidly connected to said fluid passage,
      wherein said diaphragm enables said floating seal to move in all directions.

2. The adsorptive gas separator of claim 1, wherein said at least one port assembly further comprises a mechanical, pneumatic, electro-magnetic, and/or hydraulic biasing device for urging said floating seal to contact said rotor assembly.

3. The adsorptive gas separator of claim 2, wherein said at least one port assembly further comprises a seal force adjustor for adjusting the mechanical, pneumatic, electro-magnetic, and/or hydraulic biasing device.

4. The adsorptive gas separator of claim 2, wherein the mechanical, pneumatic, electro-magnetic, and/or hydraulic biasing device comprises a spring or a bellow.

5. The adsorptive gas separator of claim 1, wherein said at least one port assembly further comprises a housing for attaching said diaphragm to said stator.

6. The adsorptive gas separator of claim 5, wherein said housing comprises a material having a thermal conductivity of less than 10 W/m·K.

7. The adsorptive gas separator of claim 1, wherein said floating seal comprises a material having a thermal conductivity less than 10 W/m·K.

8. The adsorptive gas separator of claim 1, wherein said floating seal comprises a polytetrafluoroethylene, a graphite, or an aramid material.

* * * * *